(12) United States Patent
Tan et al.

(10) Patent No.: US 12,008,363 B1
(45) Date of Patent: Jun. 11, 2024

(54) DELIVERING PORTIONS OF SOURCE CODE BASED ON A STACKED-LAYER FRAMEWORK

(71) Applicant: International Business Machines Corporation, Armonk, NY (US)

(72) Inventors: Fei Tan, Beijing (CN); Zhan Peng Huo, Beijing (CN); Jiu Chang Du, Beijing (CN); Lu Yan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/375,194

(22) Filed: Jul. 14, 2021

(51) Int. Cl.
*G06F 8/72* (2018.01)
*G06F 8/75* (2018.01)
*H04L 9/40* (2022.01)

(52) U.S. Cl.
CPC .................. *G06F 8/72* (2013.01); *G06F 8/75* (2013.01); *H04L 63/0442* (2013.01)

(58) Field of Classification Search
CPC ........... G06F 8/72; G06F 8/75; H04L 63/0442
See application file for complete search history.

(56) References Cited

U.S. PATENT DOCUMENTS

| | | | |
|---|---|---|---|
| 7,454,744 B2 | 11/2008 | Bhogal | |
| 7,849,329 B2 | 12/2010 | Chen | |
| 7,996,671 B2 | 8/2011 | Chheda | |
| 8,006,236 B1 | 8/2011 | Kilgard et al. | |
| 8,166,483 B2 | 4/2012 | Chrabieh | |
| 8,171,461 B1 | 5/2012 | Kilgard | |
| 8,261,237 B2 | 9/2012 | Zeidman | |
| 8,938,728 B2 | 1/2015 | Kawachiya | |
| 8,990,102 B1 | 3/2015 | Mowry | |
| 9,684,495 B2 | 6/2017 | Adler | |

(Continued)

FOREIGN PATENT DOCUMENTS

| CN | 101377736 B | 7/2010 |
|---|---|---|
| CN | 102087608 B | 6/2015 |

(Continued)

OTHER PUBLICATIONS

Altiparmak et al., "Source Code Generation For Large Scale Applications" (Year: 2013).*

(Continued)

*Primary Examiner* — Phillip H Nguyen
(74) *Attorney, Agent, or Firm* — Stephen R. Yoder

(57) ABSTRACT

Various embodiments of the present invention provide a method, system, and program product that perform the following operations: organizing a project having source code into a stacked-layer framework, the stacked-layer framework having: (i) a code layer including the source code of the project, (ii) a label layer including one or more label pages labelling the source code according to respective features of the source code, and (iii) a mask layer including one or more mask pages concealing portions of the source code according to labels of the label layer; receiving a request from a user to utilize a portion of the project, wherein the request includes a user requirement identifying one or more desired features; identifying a mask page of the one or more mask pages corresponding to the one or more desired features identified by the user requirement; and communicating the identified mask page to the user.

20 Claims, 14 Drawing Sheets

(56) References Cited

U.S. PATENT DOCUMENTS

| | | | |
|---|---|---|---|
| 9,753,727 | B2 | 9/2017 | Ngai |
| 10,261,889 | B2 | 4/2019 | Asthana |
| 2005/0086633 | A1* | 4/2005 | Nachmanson ............ G06F 8/71 |
| | | | 717/101 |
| 2009/0254538 | A1 | 10/2009 | Arthurs |
| 2013/0074038 | A1 | 3/2013 | Fox |
| 2016/0048376 | A1 | 2/2016 | Charupally |
| 2016/0275287 | A1* | 9/2016 | Wiest .................... G06F 21/562 |
| 2017/0286650 | A1* | 10/2017 | Hook ..................... G06F 21/14 |
| 2019/0108006 | A1 | 4/2019 | Sandanagobalane |

FOREIGN PATENT DOCUMENTS

| | | |
|---|---|---|
| CN | 103562870 B | 5/2016 |
| CN | 106227611 A | 12/2016 |
| CN | 104461569 B | 2/2018 |
| CN | 105719498 B | 2/2021 |
| JP | 6491725 B2 | 3/2019 |

OTHER PUBLICATIONS

"Moose, a platform for software and data analysis", Moose Technology, downloaded from the Internet on Feb. 4, 2021, 13 pages.

"openssh / openssh-portable", GitHub, downloaded from the Internet on Apr. 13, 2021, 16 pages, <https://github.com/openssh/openssh-portable>.

Box et al., "Time Series Analysis: Forecasting and Control", Fifth Edition, Copyright 2016 by John Wiley & Sons, Inc., 709 pages.

Fenton et al., "Software Metrics: A Rigorous and Practical Approach", Abstract, Third Edition, Oct. 2014, 6 pages.

Green et al., "Qualitative Methods for Health Research", Book Description, Mar. 2018, 3 pages.

Li et al., "VulDeePecker: A Deep Learning-Based System for Vulnerability Detection", arXiv:1801.01681v1 [cs.CR] Jan. 5, 2018, Network and Distributed Systems Security (NDSS) Symposium 2018, Feb. 18-21, 2018, San Diego, CA, USA, 15 pages.

Mell et al., "The NIST Definition of Cloud Computing", Recommendations of the National Institute of Standards and Technology, Special Publication 800-145, Sep. 2011, 7 pages.

Pharr et al., "Physically Based Rendering From Theory to Implementation", Book Description, Published Date: Sep. 30, 2016, 6 pages.

Rueden et al., "ImageJ2: ImageJ for the next generation of scientific image data", BMC Bioinformatics (2017) 18:529, DOI 10.1186/s12859-017-1934-z, 26 pages.

Schweitzer et al., "Magnetic bearings. Theory, design, and application to rotating machinery", Abstract, Publication Date: Jul. 1, 2009, DOI: 10.1007/978-3-642-00497-1, 3 pages.

Virtanen et al., "SciPy 1.0: fundamental algorithms for scientific computing in Python", Nature Methods, vol. 17, Mar. 2020, pp. 261-272, <https://doi.org/10.1038/s41592-019-0686-2>.

* cited by examiner

DELIVERING PORTIONS OF SOURCE CODE BASED ON A STACKED-LAYER FRAMEWORK

BACKGROUND OF THE INVENTION

The present invention relates generally to the field of source code management, and more particularly to delivering an intended portion of source code based on a stacked-layer framework.

Generally, in software engineering, source code management systems are responsible for managing changes to computer programs, documents, large web sites, or other collections of information. For example, source code management enables developers to retain multiple copies of source code (e.g., different versions), identify the copies respectively, and make the copies available to other parties.

SUMMARY

Various embodiments of the present invention provide a method, system, and program product that perform the following operations (not necessarily in the following order): organizing a project having source code into a stacked-layer framework, the stacked-layer framework having: (i) a code layer including the source code of the project, (ii) a label layer including one or more label pages labelling the source code according to respective features of the source code, and (iii) a mask layer including one or more mask pages concealing portions of the source code according to labels of the label layer; receiving a request from a user to utilize a portion of the project, wherein the request includes a user requirement identifying one or more desired features; identifying a mask page of the one or more mask pages corresponding to the one or more desired features identified by the user requirement; and communicating the identified mask page to the user.

DETAILED DESCRIPTION

Figure 1:
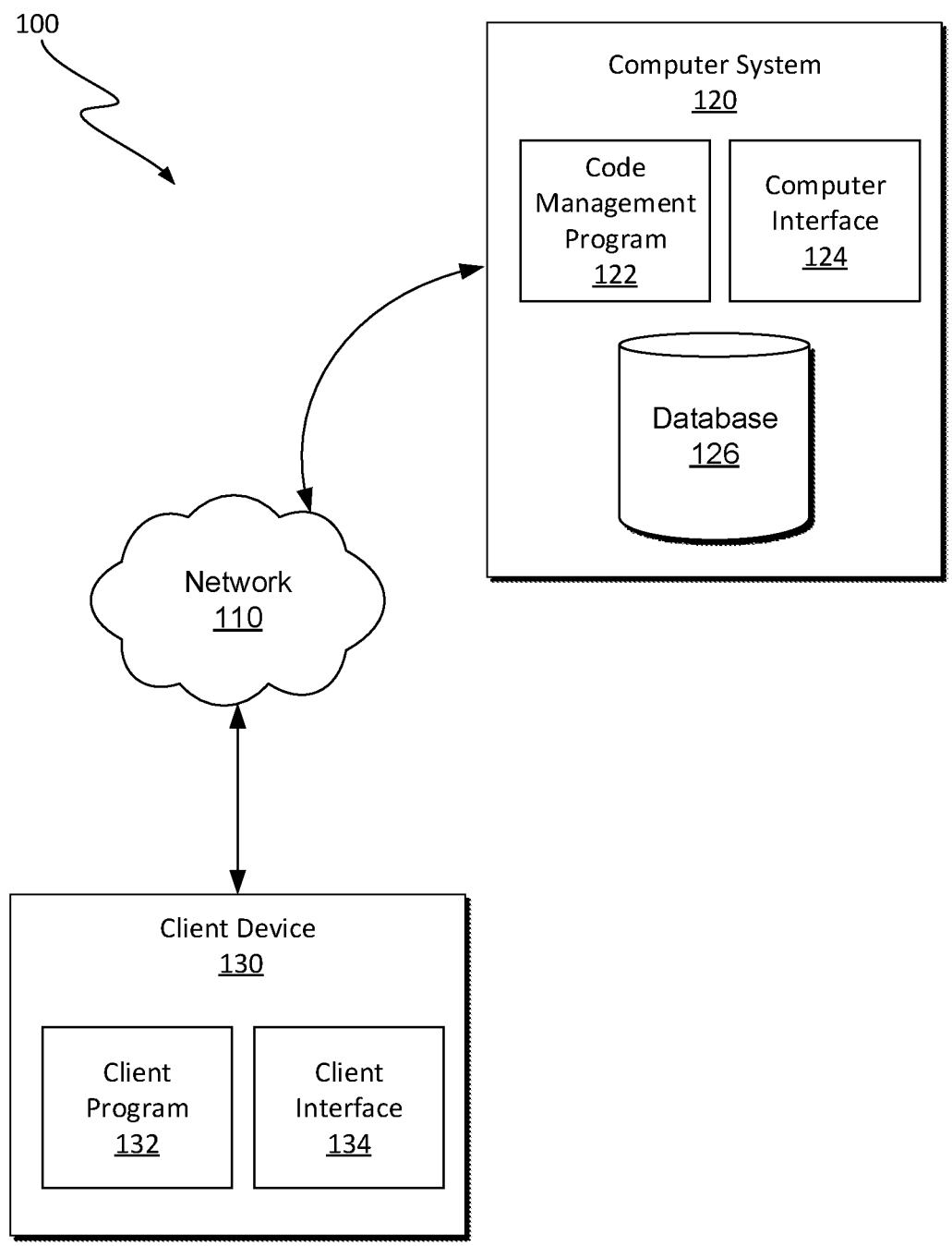
FIG. 1 is a functional block diagram illustrating a computing environment, in which a system compiles an intended portion of source code, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that in a modernized digital environment, it can be difficult to port a project in a code management system to a different platform architecture. For example, in many cases, the project may not be able to be split due to constraints placed on functional modules that work in parallel. Various embodiments of the present invention provide for a more efficient and effective system to partition source code by features or functions to aid in automatic micro-compiling. Furthermore, embodiments of the present invention provide for a system to construct a stacked-layer framework that comprises a code layer, a label layer, and a mask layer and further generate a request to extract partitioned source code from a project website and communicate the partitioned source code to a user.

Various embodiments of the present invention provide for a system to partition source code based, at least in part, on features and/or functions of the source code, to assist further in the automatic process of micro-compiling. By partitioning source code, various embodiments improve the efficiency and efficacy of porting work across various projects and collaboration among employees and teammates. Various embodiments of the present invention also utilize various source code management tools known in the art (e.g., git, RTC, SVN) for flexibility and security of the source code. Various embodiments of the present invention assist developers in accurately estimating work production and further, fit into agile development to allow for modular development and team collaboration across various projects.

Various embodiments of the present invention provide a technological improvement over known solutions for porting source code. Embodiments of the present invention improve over conventional systems by providing more efficient micro-compiling for source code that, in turn, reduces overall load and dependency. Embodiments of the present invention recognize that a computer system would also see a decrease in load because the system would more efficiently separate source code by the associated features and functions, allowing for automatic micro-compiling to port work and facilitate collaboration among teammates. Embodiments of the present invention further recognize that the incorporation of a stacked-layer framework allows for the system to determine the intended portion of source code to be ported by combining the code layer with the mask layer, where the mask layer is fetched from the project website.

The present invention will now be described in detail with reference to the Figures.

FIG. 1 is a functional block diagram illustrating a computing environment, generally designated 100, in accordance with an embodiment of the present invention. Computing environment 100 includes computer system 120 and client device 130. Computer system 120 includes code management program 122, computer interface 124, and database 126. Client device 130 includes client program 132 and client interface 134.

In various embodiments of the present invention, computer system 120 is a computing device that can be a standalone device, a server, a laptop computer, a tablet computer, a netbook computer, a personal computer (PC), a personal digital assistant (PDA), an augmented reality eyewear or headset, a smartwatch, a desktop computer or any programmable electronic device capable of executing machine readable program instructions and communications with client device 130. In another embodiment, computer system 120 represents a computing system utilizing clustered computers and components to act as a single pool of seamless resources. In general, computer system 120 can be any computing device or a combination of devices with access to client device 130, and network 110 and is capable of executing code management program 122, computer interface 124, and database 126. Computer system 120 may include internal and external hardware components as depicted and described in further detail with respect to FIG. 14.

In this exemplary embodiment, code management program 122 and computer interface 124 are stored on computer system 120. However, in other embodiments, code management program 122 and computer interface 124 may be stored externally and accessed through a communication network, such as network 110. Network 110 can be, for example, a local area network (LAN), a wide area network (WAN) such as the Internet, or a combination of the two, and may include wired, wireless or any other connection known in the art. In general, network 110 can be any combination of connections and protocols that will support communications between computer system 120 and client device 130, in accordance with a desired embodiment of the present invention.

Code management program 122 is depicted in FIG. 1 for illustrative simplicity. In various embodiments of the present invention, code management program 122 represents logical operations executing on computer system 120, where computer interface 124 manages the ability to view these logical operations and their results on computer system 120. Computer system 120 can include any number of logical operations that are managed and executed in accordance with code management program 122. In some embodiments, code management program 122 represents a program that analyzes source code data. Additionally, code management program 122, when executing, operates to monitor the source code data that was analyzed and generates a modification to the source code based on, but not limited to, the analyzation operation. In some embodiments, code management program 122 determines whether a specific action is likely to take place and generates a modification request and communicates a notification to client device 130 that a modification is generated for client device 130.

Computer system 120 includes computer interface 124. Computer interface 124 provides an interface between computer system 120 and client device 130. In some embodiments, computer interface 124 can be a graphical user interface (GUI), a web user interface (WUI), or an image projector and can display text, documents, web browser, windows, user options, application interfaces, instruction for operation, images, and holography display, and includes the information (such as graphic, text, and sound) that a program presents to a user and the control sequences the user employs to control the program. In some embodiments, computer system 120 accesses data communicated from client device 130 via a client-based application that runs on computer system 120. For example, computer system 120 includes mobile application software that provides an interface between computer system 120 and client device 130.

In various embodiments of the present invention, client device 130 represents portable computing devices capable of executing machine readable program instructions and communications with computer system 120. In various embodiments, computing environment 100 includes additional various portable computing devices (i.e., a tablet computer, a smartwatch, a smartphone, a hand-held telephone) not shown. In another embodiment, client device 130 represents a computing system utilizing clustered computers and components to act as a single pool of seamless resources with access to computer system 120 and network 110. Client device 130 may include internal and external hardware components as depicted and described in further detail with respect to FIG. 14.

In various embodiments, a user utilizing client device 130 generates a request to identify code-of-interest that represents a derived section of source code (e.g., one or more features or functions from a full set of source code) and client program 132 communicates the request to code management program 122. In various embodiments, code management program 122 receives the request from client program 132 and analyzes the request to determine the section of source code the user wishes to derive from the full set of source code. In various embodiments, code management program 122 executes to micro compile the derived portion of the source code based, at least in part, on a stacked-layer framework. Additionally, code management program 122 executes to provide source management to provide release-on-demand and usage-on-demand of the derived portion of the source code.

In various embodiments, code management program 122 organizes the open-source project into a stacked-layer framework (SLF) that includes a plurality of layers. The plurality of layers include: a code layer, a label layer, and a mask layer, wherein: (i) the code layer includes source code of the open-source project, (ii) the label layer labels the source code according to a user requirement, and (iii) the mask layer reveals portions of the source code that correspond to the user requirement and conceals portions of the source code that do not correspond to the user requirement. In various embodiments, a multiple-to-one operation provides for a plurality of label and mask layers to be merged into a new label/mask layer based on the user's request to derive a section of the source code.

In various embodiments, the code layer includes a code layer book and an SLF master index. In various embodiments, the code layer book comprises a plurality of code layer pages (also referred to as "code pages"). In various embodiments, the SLF master index is an index utilized to categorize and link an original tree structure to the SLF code layer page. In various embodiments, the SLF master index records basic units of the source code, where these basic units can be derived from a code scan tool. In various embodiments, the plurality of code layer pages corresponds with a representation of the original source code. Various embodiments of the present invention provide that if a section of source code cannot fit into a single code page, then the remaining portion of the section of source code will be appended into the next code page. Embodiments of the present invention further provide that each respective code page within the plurality of code layer pages includes a size attribute that is capable of being tuned. In the respective code layer book, each code page has the same size attribute, where to set another code layer book the size attribute can be changed. In various embodiments, the code pages are capable of being sorted based, at least in part, on user preferences (e.g., code-of-interest). In various embodiments, the code scan tool is utilized to generate a code dependency view and basic units from the source code. In various embodiments, the code dependency view operates to illustrate a comprehensible function block calling dependencies to the developer. Various embodiments of the present invention provide that the code dependency view reduces the time and load on the server and system to read a high threshold level of lines of plain text source code. In various embodiments, the code scan tool provides an analysis of the basic units (e.g., classes, functions, constants, etc.) of a code entity. Various embodiments of the present invention provide that the code dependency view can further be utilized to identify and determine a user requirement within the label layer.

In various embodiments, the label layer comprises a label layer book and a label configuration list. In various embodiments, the label layer book comprises a plurality of label layer pages, and the label layer book is generated simultaneously with the label configuration list based, at least in part, on user preferences (e.g., code-of-interest). Various embodiments of the present invention provide that each respective label layer includes a state attribute: (i) ground or (ii) superposition. In various embodiments, the label layer with a ground state attribute provides for one single function or feature from a derived section of source code (i.e., code-of-interest). In various embodiments, the label layer with a superposition state attribute provides for a plurality of ground state label layers that can be merged to generate a single superposition state layer book. In various embodiments, the code-of-interest is transformed into a label configuration list, where the label configuration list describes the corresponding code-of-interest represented in the code layer book that is utilized to generate the label layer book. In various embodiments, a multiple-to-one operation is executed by code management program 122. In various embodiments, each respective code-of-interest corresponds to a single label within the label layer book. In various embodiments, code management program 122 operates to identify whether a plurality of user requirements can be merged into a single label within the label layer book.

In various embodiments, the mask layer comprises a mask layer book and a stacked-layer framework (SLF) mask table. In various embodiments the mask layer book comprises a plurality of mask layer pages to extract the code-of-interest from a project website. In various embodiments, the mask layer book comprises a plurality of simplified mask pages, where each respective mask page can be applied to its corresponding code page. In various embodiments, the SLF mask table records, for example, (i) corresponding code layer versions, (ii) respective masked pages, (iii) page transfer route regulations, and (iv) protected attributes. Various embodiments of the present invention provide release-on-demand functionality for various developers, where mask layers are utilized to deliver and publish source code for various development stages. Embodiments of the present invention further provide that usage-on-demand is generated for various users, where mask layers are utilized to obtain various derived section of features or functions of the source code. In various embodiments, each respective mask layer is generated by its corresponding label layer, where the code-of-interest is clearly established within each respective label layer. In various embodiments, within each respective mask layer, the code-without-interest (e.g., the remaining sections of features or functions of the source code that are different than the code-of-interest), is removed from the mask layer (i.e., acting as a 'mask' in this layer).

In various embodiments, code management program 122 receives a request from a user to partition a feature or function (i.e., a section) from a set of source code (i.e., code-of-interest) based, at least in part, on the utilization of a stacked-layer framework (SLF). In various embodiments, the SLF operates to provide functionality for code management program 122 to partition the code-of-interest from the representation of the original source code without the requirement of a code compiler or generation of executable code to partition the code-of-interest from the representation of the original source code. In various embodiments, code management program 122 accesses database 126 and retrieves the identified source code in the request from the user and applies the code scan tool to the source code. In various embodiments, code management program 122 executes the code scan tool to analyze the source code and code management program 122 generates a code dependency structure based, at least in part, on the results of the code scan tool. In various embodiments, code management program 122 identifies the feature or function from the user's request (i.e., user requirement) and code management program 122 applies the user requirement to the code dependency structure to tailor the corresponding source file to determine the code-of-interest to partition from the representation of the original source code. In various embodiments, code management program 122 constructs the code layer based, at least in part, on the code layer book and the SLF master index. In various embodiments, code management program 122 generates the code layer book based, at least in part, on the representation of the identified source code. In various embodiments, code management program 122 generates a plurality of code pages corresponding to the various lines of source code. In various embodiments, code management program 122 generates the SLF master index based, at least in part, on the original tree structure of the generated plurality of SLF code pages. In various embodiments, code management program 122 records the basic units of the code entities that are derived from the analysis performed by the code scan tool. In various embodiments, code management program 122 utilizes the determined code-of-interest and the SLF master index to generate the label configuration list within the label layer of the SLF. In various embodiments, code management program 122 transforms the user requirement into a label configuration list, wherein the label configuration list presents the corresponding code-of-interest in the code layer book that is utilized to generate the label layer book. In various embodiments, code management program 122 generates a mask layer that is built on top of the label layer and code layer in the SLF. In various embodiments, code management program 122 generates a mask layer based, at least in part, on the label layer, where each respective mask page corresponds to each respective label page. Various embodiments of the present invention provide that in the mask layer, the lines of source code that are not the code-of-interest (i.e., code-without-interest) are labelled being not of interest and are optionally removed (i.e., acting as a mask).

Figure 2:
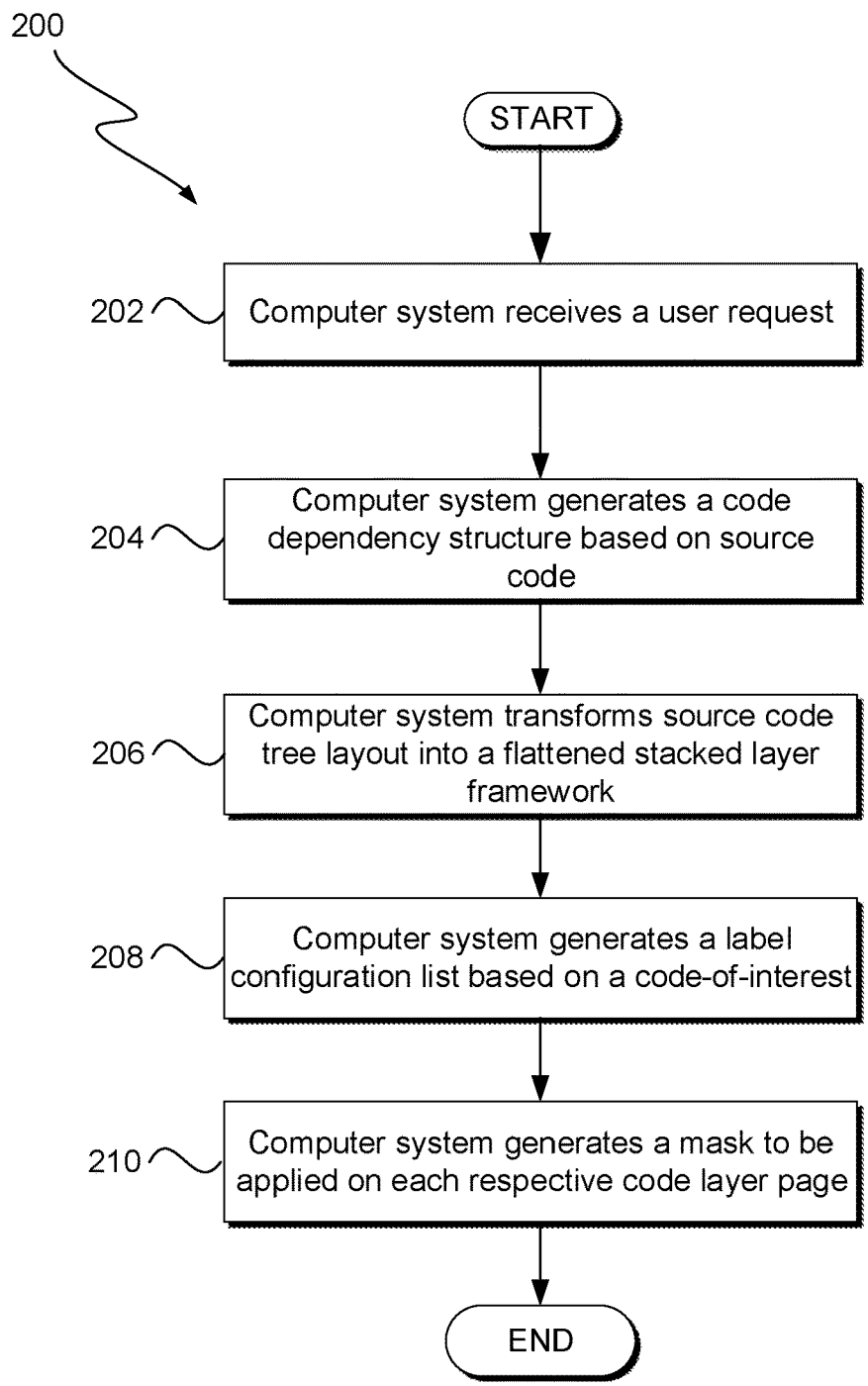
FIG. 2 illustrates operational processes of executing a system to compile an intended portion of source code on a stacked-layer framework, on a computing device within the environment of FIG. 1, in accordance with an exemplary embodiment of the present invention.

FIG. 2 is a flowchart depicting operations to partition code-of-interest from the representation of the identified source code based, at least in part, on the construction of a stacked-layer framework (SLF) for computing environment 100, in accordance with an illustrative embodiment of the present invention. More specifically, FIG. 2 depicts combined overall operations 200 of code management program 122. In some embodiments, operations 200 represents logical operations of code management program 122, wherein code management program 122 represents interactions between logical computing devices communicating with computer system 120 and various other computing devices connected to network 110. It should be appreciated that FIG. 2 provides an illustration of one implementation and does not imply any limitations with regard to the environments in which different embodiments may be implemented. Many modifications to the depicted environment may be made. In one embodiment, the series of operations, in flowchart 200, can be terminated at any operation. In addition to the features previously mentioned, any operations of flowchart 200, can be resumed at any time.

In operation 202, code management program 122 receives a user request. In various embodiments, code management program 122 receives a request from a user operating client device 130, where the request relates to (i) source code and (ii) a user requirement that correlates to a single specified feature or function within the source code. In various embodiments, code management program 122 analyzes the request and determines the source code and the user requirement. In various embodiments, code management program 122 accesses database 126 and retrieves the source code stored on database 126.

In operation 204, code management program 122 generates a code dependency structure based on the source code.

In various embodiments, code management program 122 includes, at least, a code scan tool that operates to generate the code dependency structure of the source code and identify the basic units of the source code (e.g., macros, variables, constants, classes, structures, functions, interfaces, etc.). In various embodiments, code management program 122 utilizes the code scan tool function to analyze the source code and organize the dependencies of the blocks of the source code. In various embodiments, code management program 122 generates an organized representation of the blocks that illustrate the dependencies of the blocks within the source code. In various embodiments, code management program 122 applies the user requirement to the code dependency structure to isolate and determine the code-of-interest from the corresponding source file that is illustrated by the code dependency structure.

In operation 206, code management program 122 transforms a source code tree layout (e.g., a layout of source code files within a source code folder) into a flattened stacked-layer framework (SLF). In various embodiments, code management program 122 generates the code layer of the SLF, where code management program 122 reformats the source code to fit into the format of the SLF. In various embodiments, code management program 122 generates a code layer book that includes, at least, a plurality of code layer pages. Various embodiments of the present invention provide that the plurality of code layer pages represents the original source code and further provides that if a section of the source code is unable to fit onto a single code layer page, then the remaining portion of the section of the source code will be appended onto the next respective code layer page. In various embodiments, code management program 122 reformats the various sections of the source code and reformats each respective section into a flattened code layer page, where the plurality of code layer pages represents the code layer book. In various embodiments, code management program 122 generates an SLF master index, where code management program 122 links the original tree structure (e.g., the layout of source code files within a source code folder) to the respective corresponding SLF code layer page. Additionally, in various embodiments, the SLF master index records the basic units associated with the source code in the code entities on the code layer page.

In operation 208, code management program 122 generates a label configuration list based on a code-of-interest. In various embodiments, code management program 122 transforms the original user requirement into a label configuration list which includes, but is not limited to, (i) a label name, (ii) related files, and (iii) the dependent blocks identified in the code dependency view. In various embodiments, the label configuration list corresponds with the code-of-interest in the code layer book. In various embodiments, code management program 122 generates the label layer book based, at least in part, on the corresponding code page from the code layer book that represents the user requirement. In various embodiments, code management program 122 determines the state attribute that applies to each respective label layer book. Various embodiments of the present invention provide that code management program 122 determines the state attribute of each respective label layer book based, at least in part, on whether the label layer book has one label or a plurality of labels. In various embodiments, code management program 122 assigns a first label layer book a state attribute of ground state if the label layer book has one label (e.g., if the label layer book has a single user requirement). In various embodiments, code management program 122 assigns a second label layer book a state attribute of superposition state if the label layer book has a plurality of labels (e.g., if a plurality of label layer books have been merged to create a single new label layer book). In various embodiments, each respective single user requirement corresponds to one label layer book. Various embodiments of the present invention provide that, in some cases, code management program 122 identifies a plurality of label layer books and merges the plurality of label layer books into a single new label layer book.

In operation 210, code management program 122 generates a mask to be applied to each respective code layer page. In various embodiments, code management program 122 generates a mask layer that is built upon the label layer and the code layer in the stacked-layer framework (SLF). In various embodiments, code management program 122 generates a mask layer book and an SLF mask table. In various embodiments, code management program 122 generates the mask layer book based, at least in part, on a plurality of simplified mask pages, where each respective mask page corresponds with a code page from the code layer book. In various embodiments, the simplified mask pages represent the identified code-of-interest in the code page and further the mask pages hide (e.g., delete) the code-without-interest text on the mask layer page so that only the code-of-interest is presented. In various embodiments, code management program 122 generates an SLF mask table that records (i) the corresponding code layer version of the source code, (ii) the masked code-without-interest, (iii) the page transfer route regulation, and (iv) the state attributes associated with the corresponding code layer pages. In various embodiments, code management program 122 stores the entire SLF on the project website (e.g., database 126) that includes the code layer, label layer, and mask layer.

Figure 3:
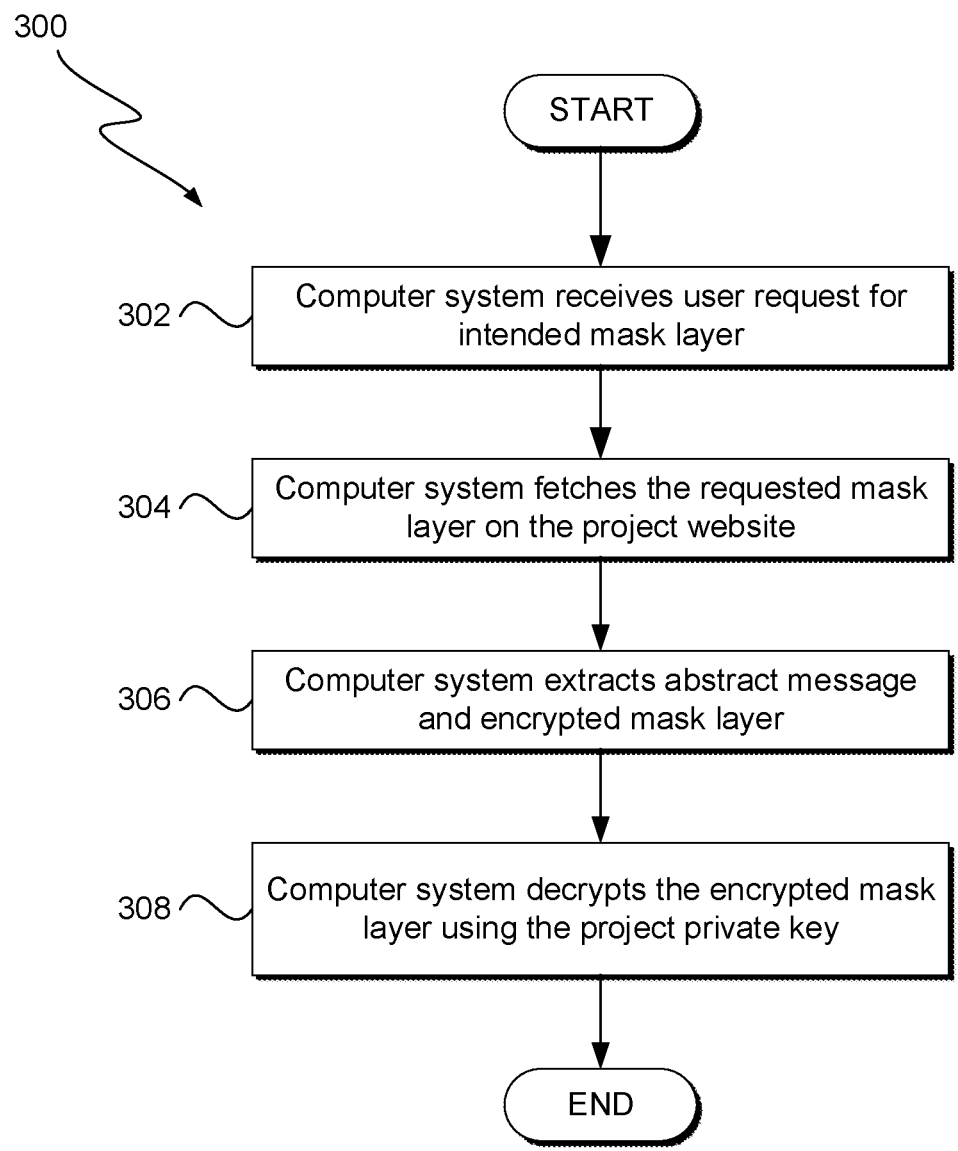
FIG. 3 illustrates operational processes of executing a system for fetching a mask layer of source code from a project website, on a computing device within the environment of FIG. 1, in accordance with an exemplary embodiment of the present invention.

FIG. 3 depicts flowchart, 300, depicting operations of code management program 122 in computing environment 100, in accordance with an illustrative embodiment of the present invention. More specifically, FIG. 3, depicts combined overall operations, 300, of code management program 122 executing on computer system 120. In some embodiments, operations 300 represents logical operations of code management program 122, wherein interactions between code management program 122 and client program 132 represent logical units executing on computer system 120. Further, operations 300 can include a portion or all of combined overall operations of 200. In various embodiments, the series of operations 300, can be performed at the conclusion of operations 200. It should be appreciated that FIG. 3 provides an illustration of one implementation and does not imply any limitations with regard to the environments in which different embodiments may be implemented. Many modifications to the depicted environment may be made. In one embodiment, the series of operations, of flowchart 300, can be performed simultaneously. Additionally, the series of operations in flowchart 300 can be terminated at any operation. In addition to the features previously mentioned, any operations of flowchart 300 can be resumed at any time.

In operation 302, code management program 122 receives a user request for an intended mask layer. In various embodiments, the mask layer corresponds to a stacked-layer framework (SLF) relating to a source code that is stored on a project website (e.g., database 126). In various embodiments, portions of the project website, such as the mask layer, are encrypted utilizing an encryption key. Various embodiments of the present invention provide that the encryption uses asymmetrical-key algorithms and/or other encryption methods known in the art. In various embodiments, users are authorized and the authorized users are required to input a private random value into a key generation program which generates two keys, a public key and a private key. Various embodiments of the present invention provide that the source code and the mask layers are encrypted on the project website. In various embodiments, code management program 122 receives a public key from the user identified in the request and code management program 122 utilizes the user's public key to provide authorization for the user to access the project website and to further identify the intended mask layer located on the project website.

In operation 304, code management program 122 fetches the requested mask layer on the project website. In various embodiments, code management program 122 determines an abstract message utilizing an abstract algorithm (e.g., md5 message-digest algorithm that produces a 128-bit hash value). In various embodiments, code management program 122 communicates to the project website that code management program 122 has determined the abstract message based, at least in part, on the abstract algorithm and stores this communication in the mask layer on the project website (e.g., records the communication on the SLF mask table). In various embodiments, code management program 122 encrypts the fetched mask layer data from the project website utilizing the project's public key. Additionally, in various embodiments, code management program 122 encrypts the determined abstract message and the encrypted fetched mask layer with the user's public key and communicates this data to client program 132 with program instructions instructing client program 132 to present the data to the user of client device 130.

In operation 306, code management program 122 provides program instructions instructing client program 122 to extract the abstract message and the encrypted mask layer. In various embodiments, code management program 122 communicates program instructions instructing client program 122 to coach the user to utilize the user's private key to decrypt and extract the abstract message and the encrypted mask layer. Various embodiments of the present invention provide that the encrypted mask layer was encrypted using the project website's public key, and that decrypting the combination of the abstract message and the encrypted mask layer leaves the mask layer in an encrypted state. In various embodiments, code management program 122 provides program instructions instructing client program 122 to authenticate the decrypted abstract message with the announced abstract message stored on the project website. In various embodiments, if the decrypted abstract message matches the announced abstract message stored on the project website, then client program 132 receives a notification from code management program 122 to communicate the encrypted mask layer data, which was encrypted with the corresponding project website's public key, to computer system 120. In various embodiments, if the decrypted abstract message does not match the announced abstract message stored on the project website, then code management program 122 receives a notification from client program 122 indicating the unauthenticated abstract message.

In operation 308, upon receiving the encrypted mask layer data from client program 132, code management program 122 decrypts the encrypted mask layer data using the project private key. In various embodiments, code management program 122 communicates the encrypted mask layer data and the project public key to the project website with program instructions instructing the project website to decrypt the data, as discussed in operation 306, using the project's private key, to fetch the mask layer. In various embodiments, code management program 122 further communicates program instructions instructing the project website to utilize the decrypted mask layer data to fetch the corresponding code layer from the code layer book and to further fetch the corresponding source code. In various embodiments, code management program 122 receives the corresponding code layer and the corresponding source code to the decrypted mask layer and code management program 122 encrypts the corresponding source code with the user's public key and code management program 122 communicates the encrypted corresponding source code to client program 122 with program instructions instructing client program 122 to present the encrypted corresponding source code to the user. In various embodiments, code management program 122 communicates a set of program instructions instructing client program 122 to coach the user to decrypt the encrypted corresponding source code using the user's private key to fetch the source code. Various embodiments of the present invention provide that the fetch source code presents the code-of-interest that the user required for the feature or function from the source code.

In various embodiments, the mask layers stored on the project website are maintained in a release-on-demand format which provides the mask layers to deliver and publish source codes in different development stages for users (e.g., developers). Various embodiments of the present invention provide that the operations in flowchart 400 provide for a security mechanism to protect the original source code from unauthorized access by a user. Various embodiments of the present invention provide for usage-on-demand, where the mask layers are maintained on the project website to deliver various sections of features or functions of the source codes to authorized users.

Figure 4:
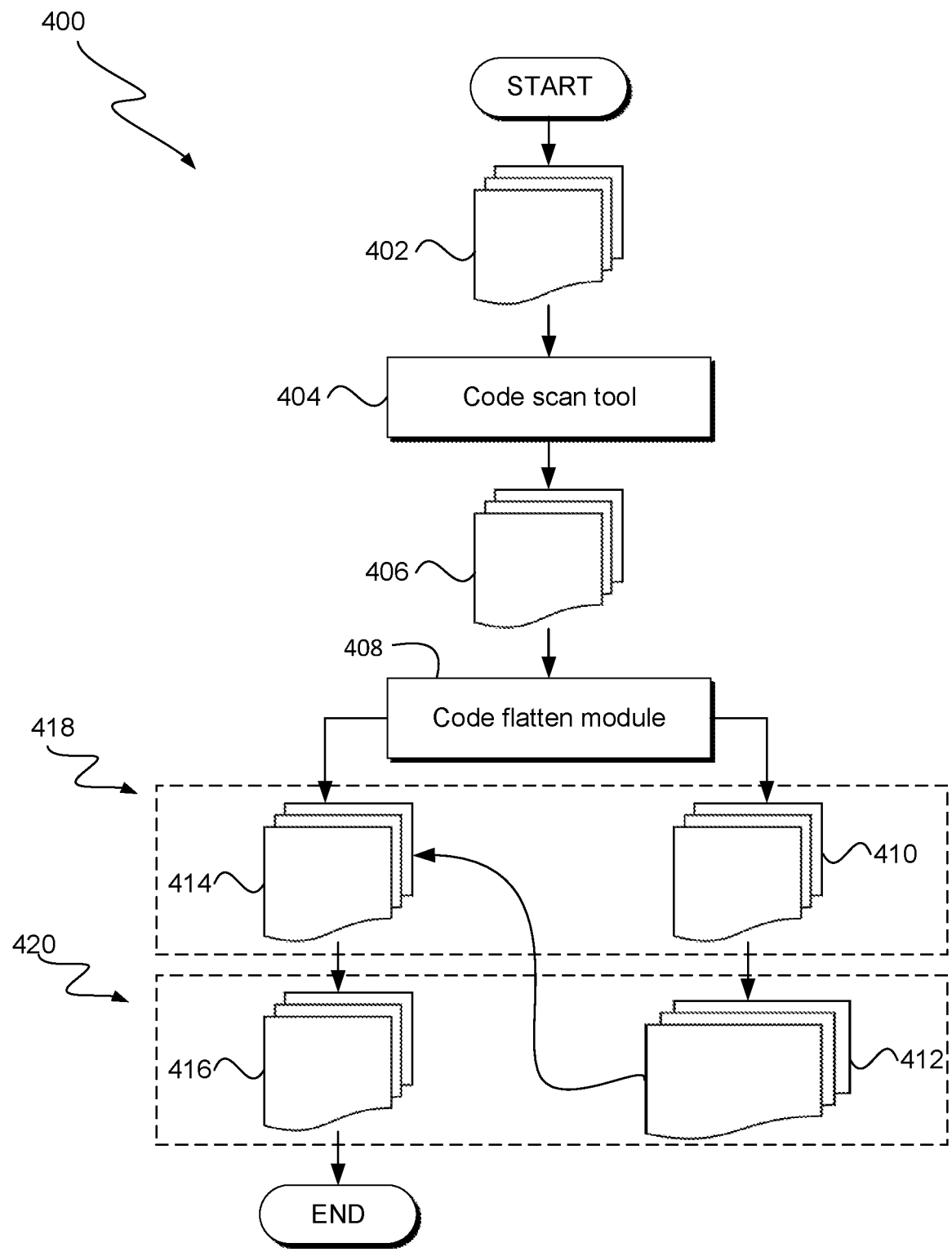
FIG. 4 depicts a block diagram of operational processes executing a system for managing source code within a stacked-layer framework, according to at least one embodiment of the present invention.

FIG. 4 depicts a block diagram that represents a methodical approach to source code management based, at least in part, on a stacked-layer framework (SLF). Various embodiments of the present invention provide that code layer 418 represents the code layer of the SLF and that label layer 420 represents the label layer of the SLF. In various embodiments, source code 402 represents source code for a program that operates on a project website and is identified based, at least in part, on a user's request. The system applies code scan tool 404 to source code 402 to construct code structure 406 (e.g., code dependency structure). In various embodiments, code flatten module 408 is executed to transform a tree layout of source code 402 into a flattened SLF layout. Various embodiments of the present invention provide that the flattened SLF layout is translated into code layer book 414 that comprises a plurality of code pages, where the plurality code pages represent source code 402. Additionally, master index 410 represents an index that is utilized to link the original tree layout of source code 402 to the SLF code page associated with code layer book 414. Various embodiments of the present invention further provide that label configuration list 412 includes, but is not limited to, the user requirement which lists the corresponding code-of-interest in code layer book 414. Label layer book 416 is generated based, at least in part, on code layer book 414 being analyzed to determine the specific code page associated with the user's requirement.

Figure 5:
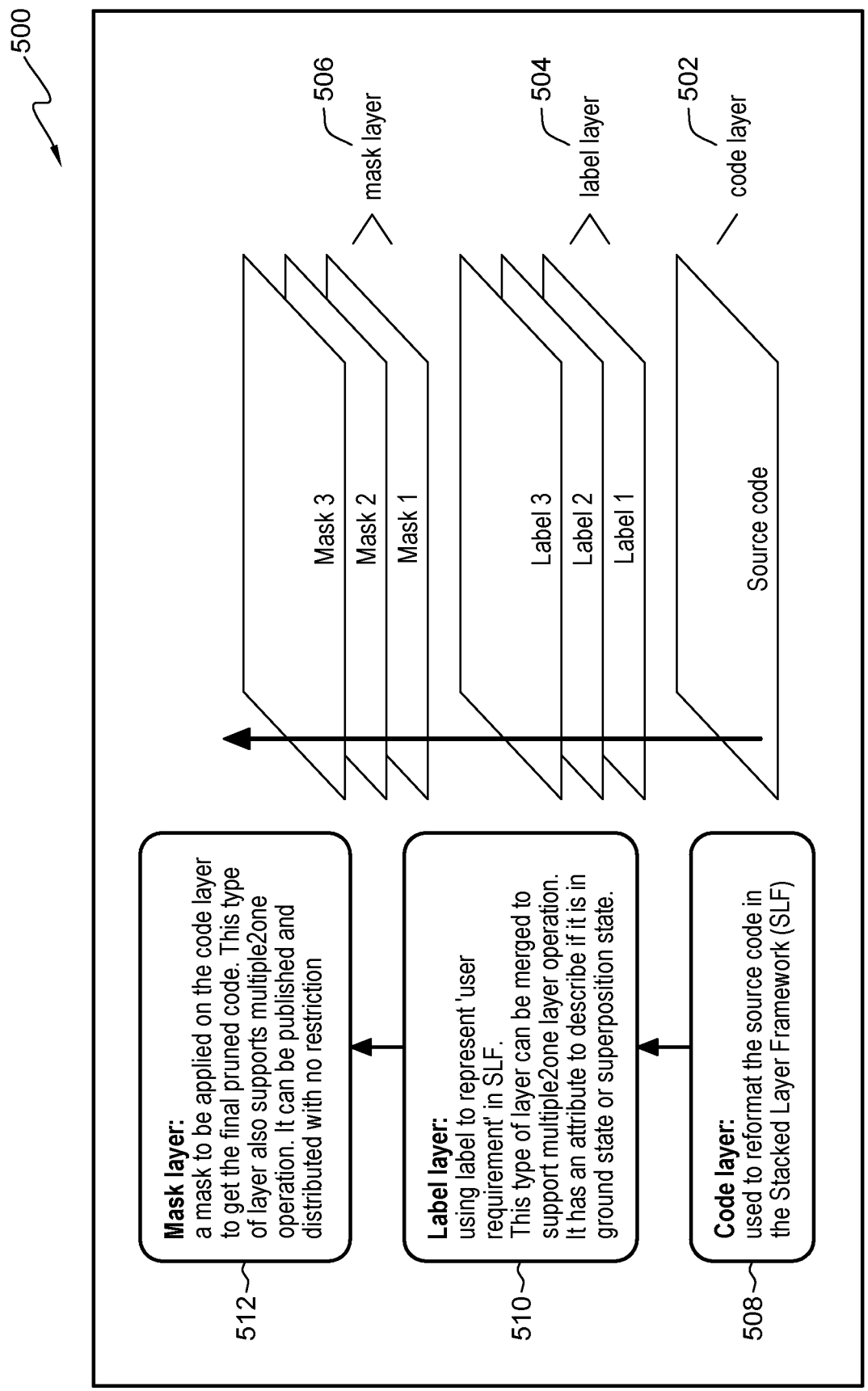
FIG. 5 depicts a block diagram of a stack layer framework, according to at least one embodiment of the present invention.

FIG. 5 depicts a block diagram that represents the stacked-layer framework (SLF), 500. Various embodiments of the present invention provide that code layer 502 where code layer description 508 illustrates that code layer 502 is used to reformat the source code for the SLF. Label layer 504 is stacked on top of code layer 502 and further label layer 504 includes a label layer book and label configuration list associated with the user's requirement, where label layer description 510 illustrates that label layer 504 can be merged to support multiple-to-one layer operation and associated attribute state based, at least in part, on a ground state and/or superposition state. Mask layer 506 is stacked on top of label layer 504. Mask layer description 512 illustrates that a mask is applied to the code layer that presents the code-of-interest, additionally, mask layer 506 supports execution of a multiple-to-one operation utilized to publish and distribute the partitioned code-of-interest.

Figure 6:
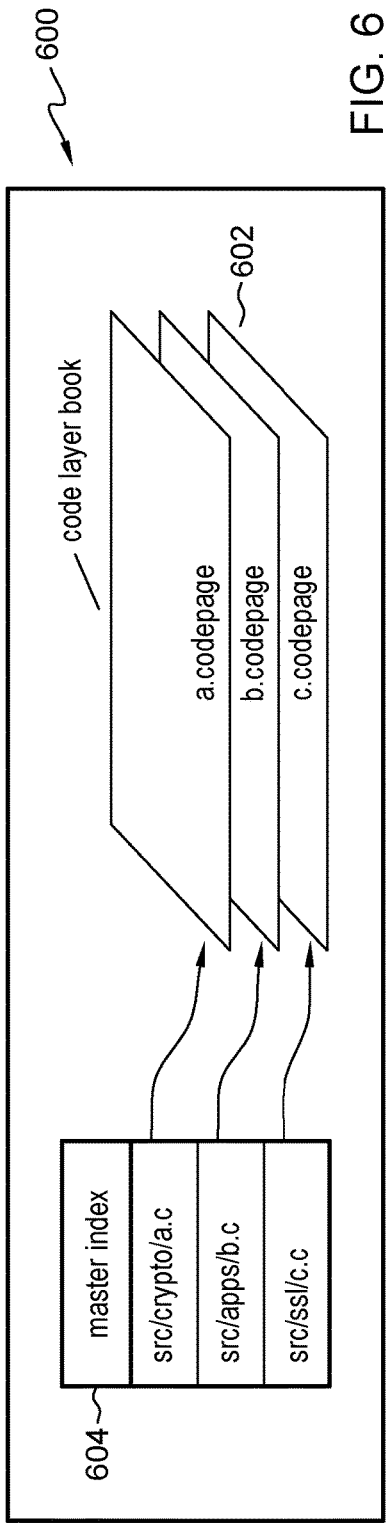
FIG. 6 depicts a block diagram of a code layer book and corresponding codepages and a stacked-layer master index, according to at least one embodiment of the present invention.

FIG. 6 depicts a block diagram that represents a code layer book 600 from a stacked-layer framework (SLF). Various embodiments of the present invention provide that the code layer book 600 includes a plurality of codepages 602 and a master index 604. The plurality of codepages 602 represent each respective codepage that corresponds with a section of source code. Additionally, master index 604 represents an index format utilized to link each original tree structure of the flattened SLF source code to each respective corresponding code page.

Figure 7:
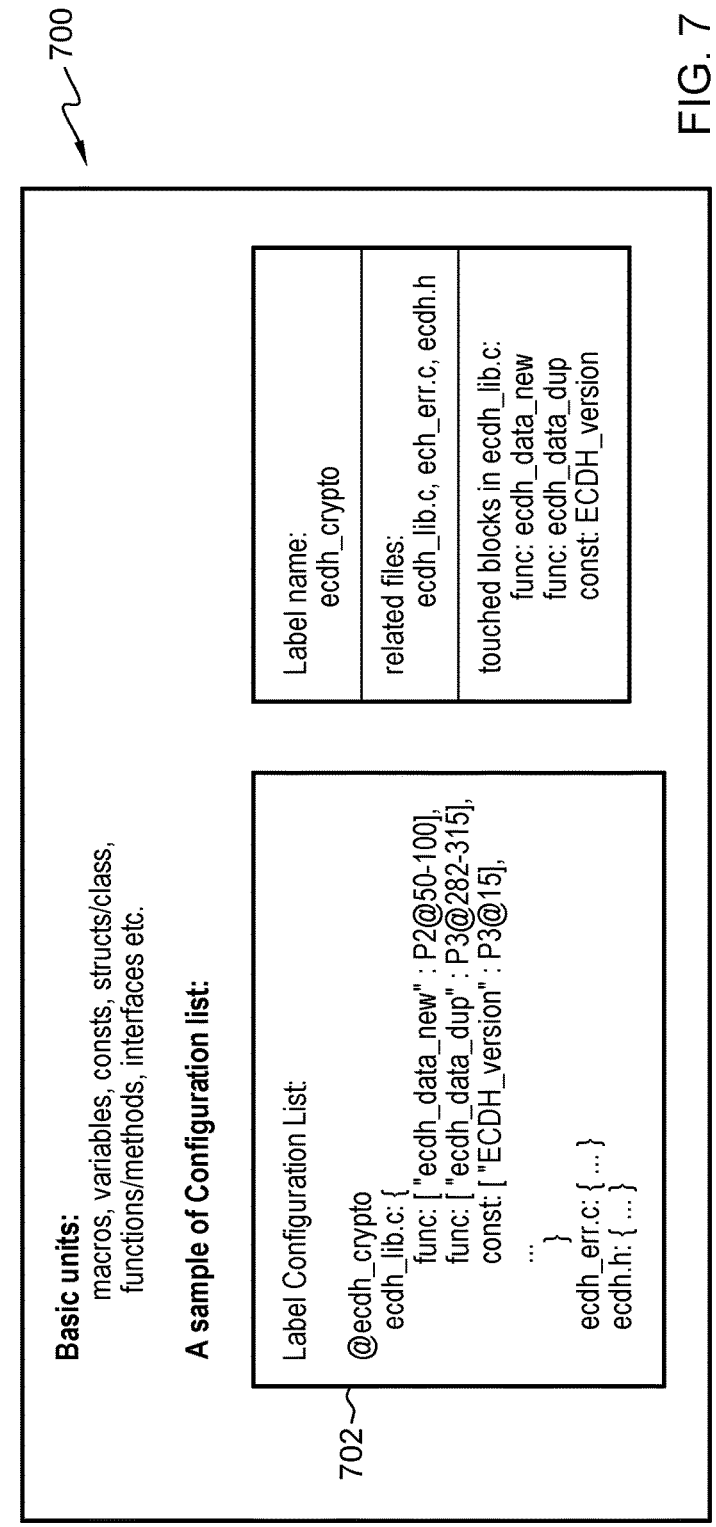
FIG. 7 depicts a sample configuration list of a label layer book, according to at least one embodiment of the present invention.

FIG. 7 depicts block diagram 700 that illustrates a label configuration list 702. Additionally, block diagram 700 provides that basic units of the source can be presented as macros, variables, constants, structures and/or classes, functions and/or methods, interfaces, etc. Further, block diagram 700 further illustrates data that includes, but is not limited to, the label name, the related files, and blocks from the code dependency view that are associated with the label name and related files. Various embodiments of the present invention provide that label configuration list 702 includes the data and information present within block diagram 700.

Figure 8:
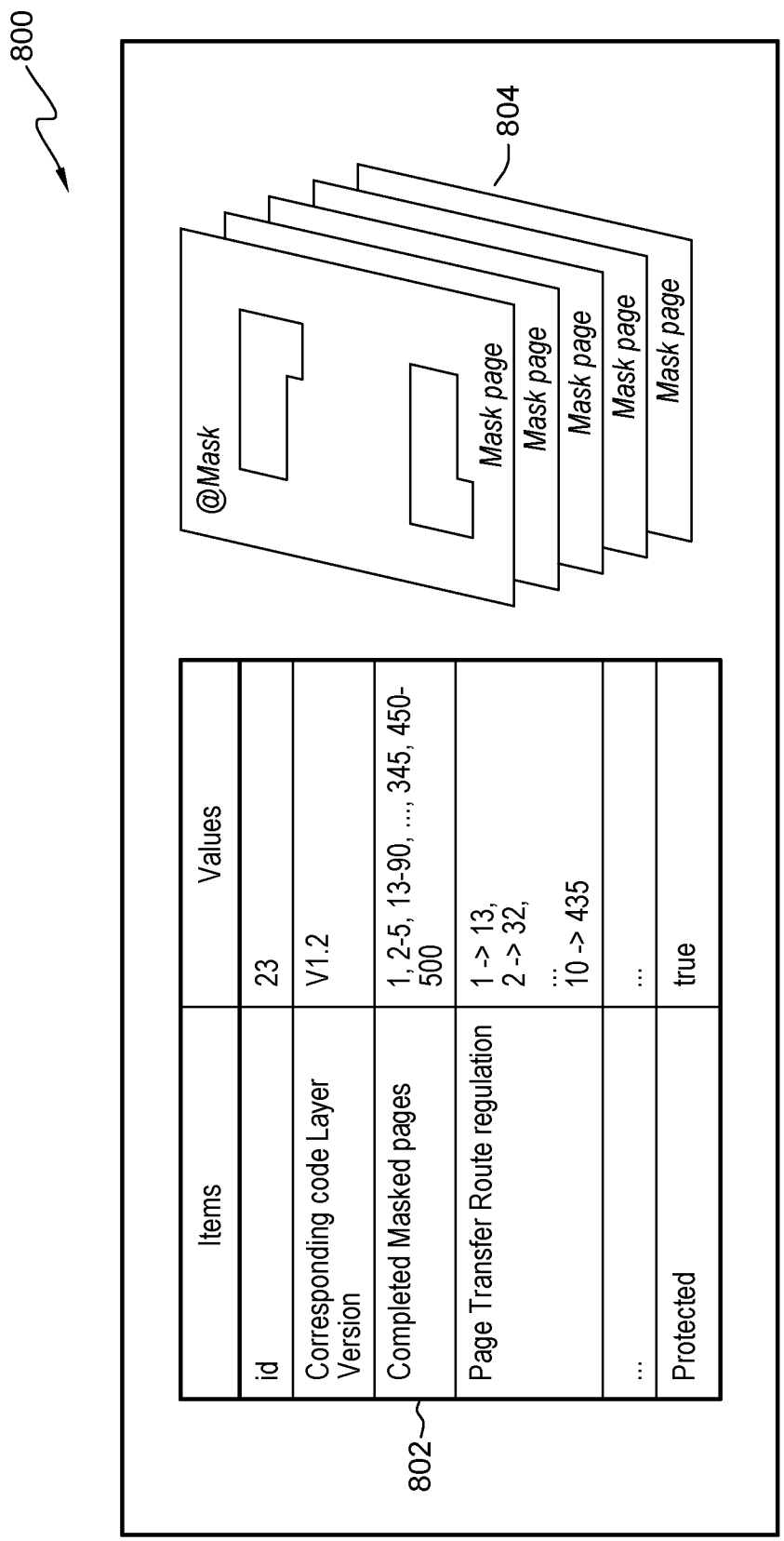
FIG. 8 depicts a block diagram of a mask layer book and a corresponding stacked-layer framework mask table, according to at least one embodiment of the present invention.

FIG. 8 depicts block diagram 800 that illustrates a mask layer table 802 and mask layer book 804. Various embodiments of the present invention provide that layer mask table 802 represents a record of each corresponding code layer and each respective mask page of mask layer book 804 that includes, but is not limited to, the page transfer route regulation and a determination of the protected status of the source code (e.g., protected, 'True' or 'False'). Mask layer book 804 comprises a plurality of simplified mask pages, where each respective mask page is applied to its corresponding code page in the code layer book.

Figure 9A:
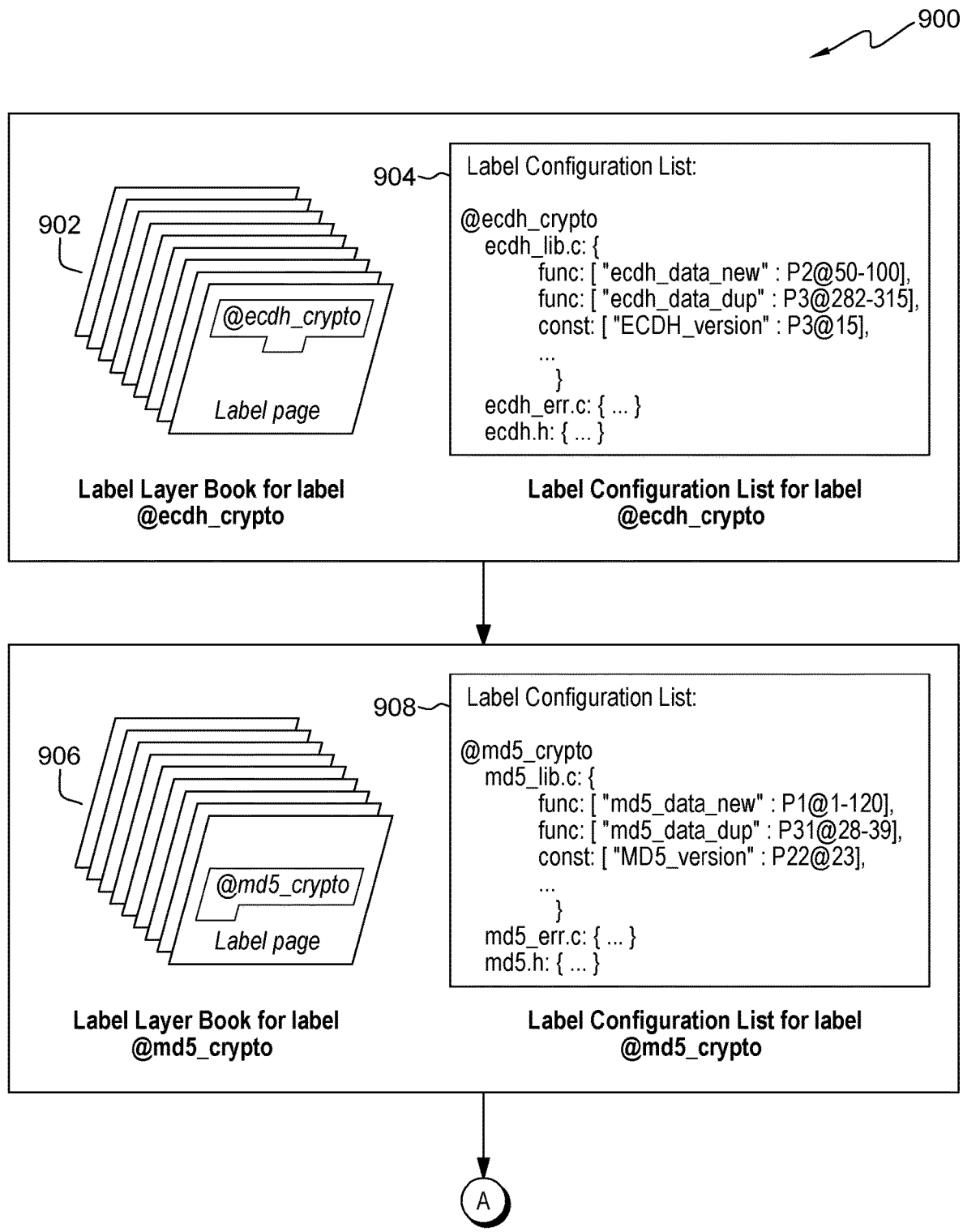
FIG. 9A and FIG. 9B depict a block diagram illustrating the combining of two or more ground state label layer books to generate at least one superposition state label layer book, according to at least one embodiment of the present invention.
Figure 9B:
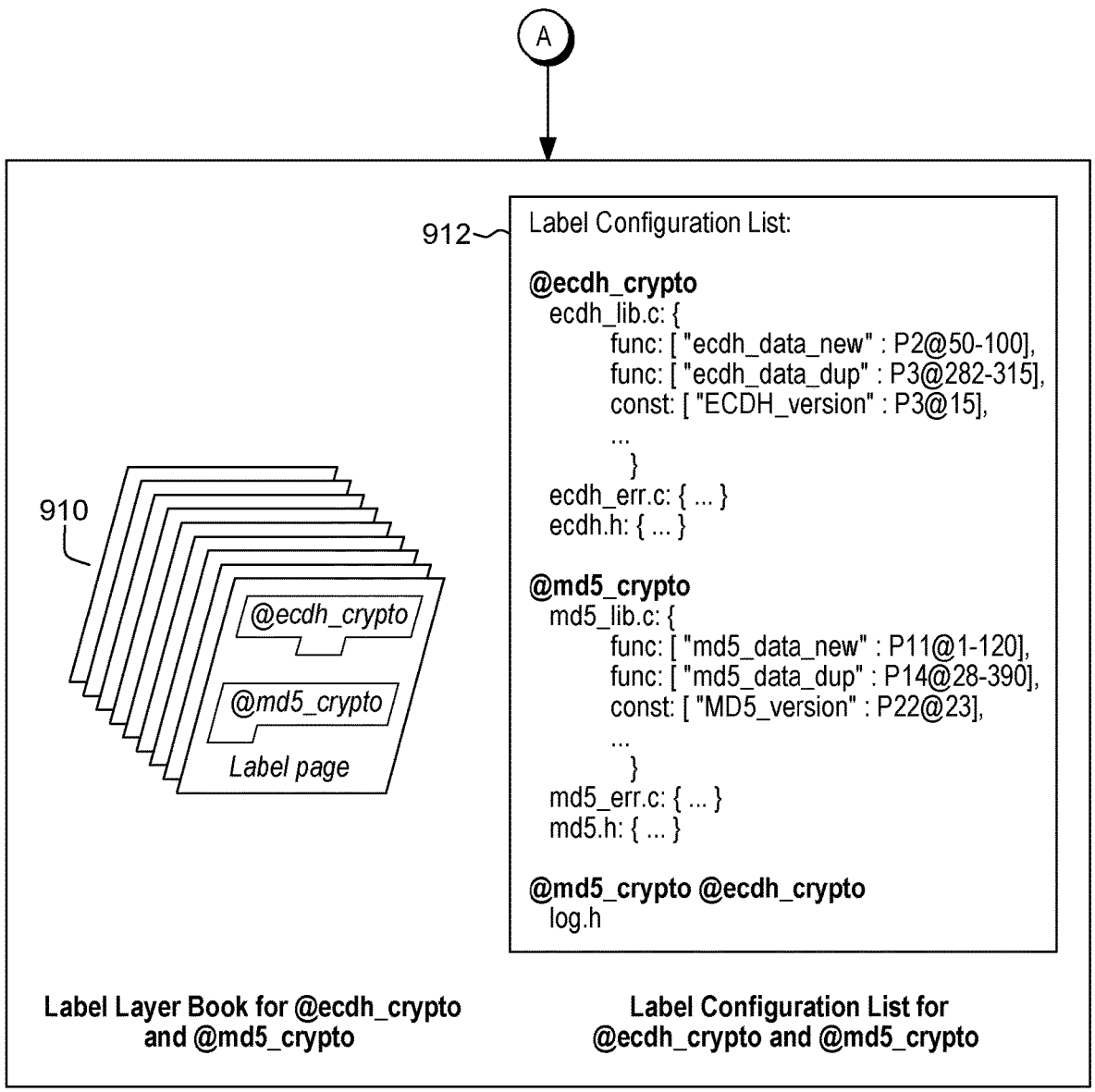

FIG. 9A and FIG. 9B depict block diagram 900 representing at least two ground state label layers merging into a single superposition label layer. In one example embodiment of the present invention, label layer book 902 represents a label layer book for source code: '@ecdh_crypto' and label configuration list 904 represents a label configuration list for source code: '@edch_crypto.' Label layer book 906 represents a label layer book for source code: '@md5_crypo' and label configuration list 908 represents a label configuration list for source code: '@md5_crypo.' In this example embodiment, source '@ edch_crypto' and '@md5_crypo' each respectively represent ground state attributes. The label layer book 902 and label layer book 906 are merged together to generate superposition label layer book 910. Additionally, label configuration list 904 and label configuration list 908 are merged together to create superposition label configuration list 912.

Figure 10:
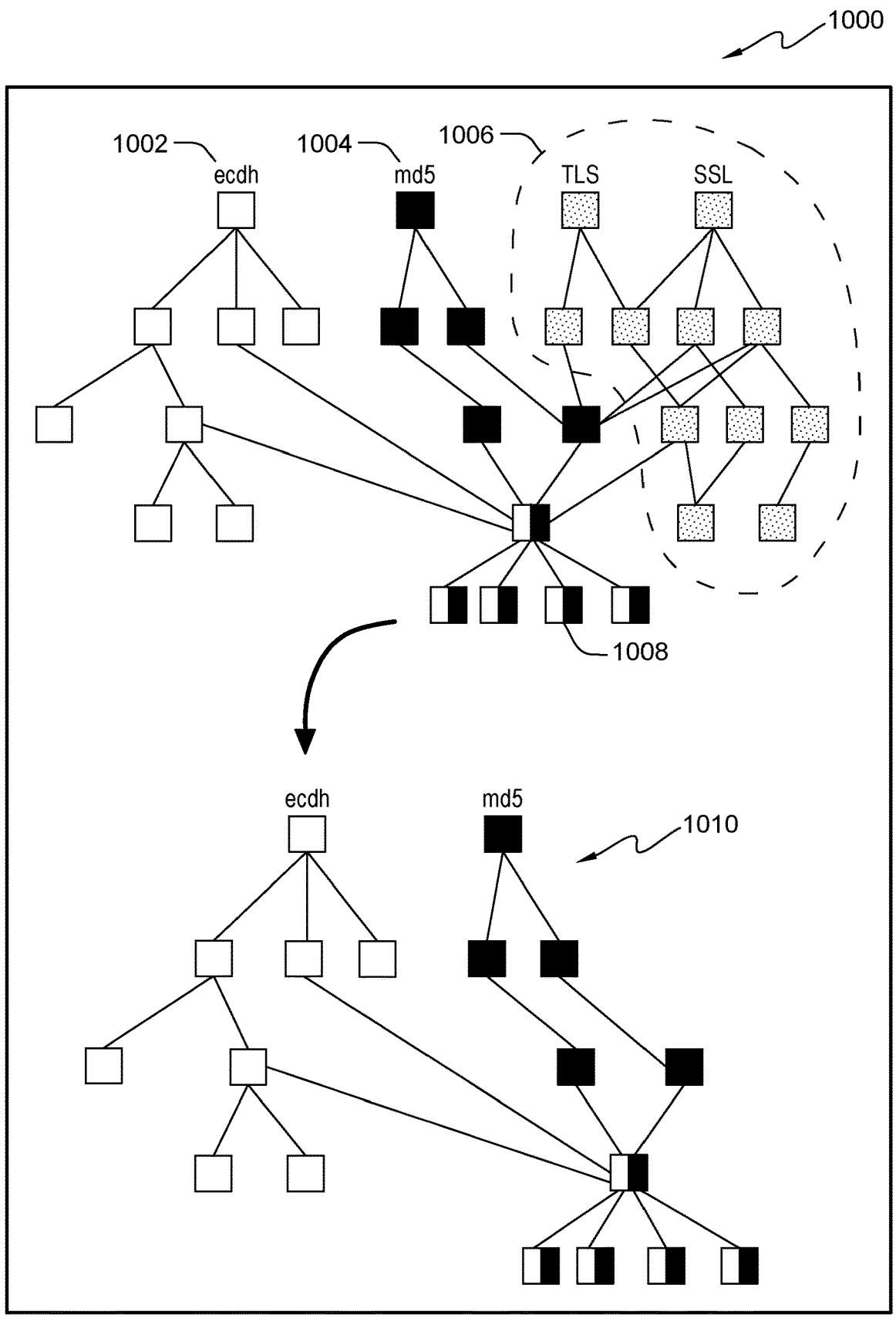
FIG. 10 depicts a visual representation of a code dependency structure, according to at least one embodiment of the present invention.

FIG. 10 depicts a visual representation of a code dependency structure 1000 and partitioning the source code to identify the code-of-interest based, at least in part, on the user requirement, as discussed above. In various embodiments, partitioning of source code to isolate the code-of-interest can be applied to part porting. In various embodiments, the user request is a request to partition the code-of-interest from an openSSL tool kit. The openSSL toolkit represents a cryptography library, where the user requirement requires the crypto algorithm for the part-porting (e.g., the crypto algorithm is the code-of-interest to be partitioned from the openSSL source code). In various embodiments, code management program 122 applies the code scan tool to the openSSL source code, and the code structure is built. The code structure includes, but is not limited to, ecdh function 1002, md5 function 1004, and TLS and SSL function 1006. TLS and SSL function 1006 are not required according on the user requirement. As depicted in FIG. 10, the nodes from the code dependency structure associated, at least, with ecdh function 1002 are included in the label layer book for '@ecdh_crypto' and the nodes from the code dependency structure associated, at least, with md5 function 1004 are included in the label layer book for '@md5_crypto.' Various embodiments of the present invention provide that hybrid nodes 1008 are included in both label layer books for '@ecdh_crypto' and '@md5_crypto', respectively. Tailored nodes 1010 represent the partitioned code-of-interest from the source code (e.g., open SSL). Additionally, a multiple-to-one operation can be applied to merge the label layer book '@ecdh_crypto' and label layer book '@md5_crypto' into a new single label layer, as discussed above.

Figure 11:
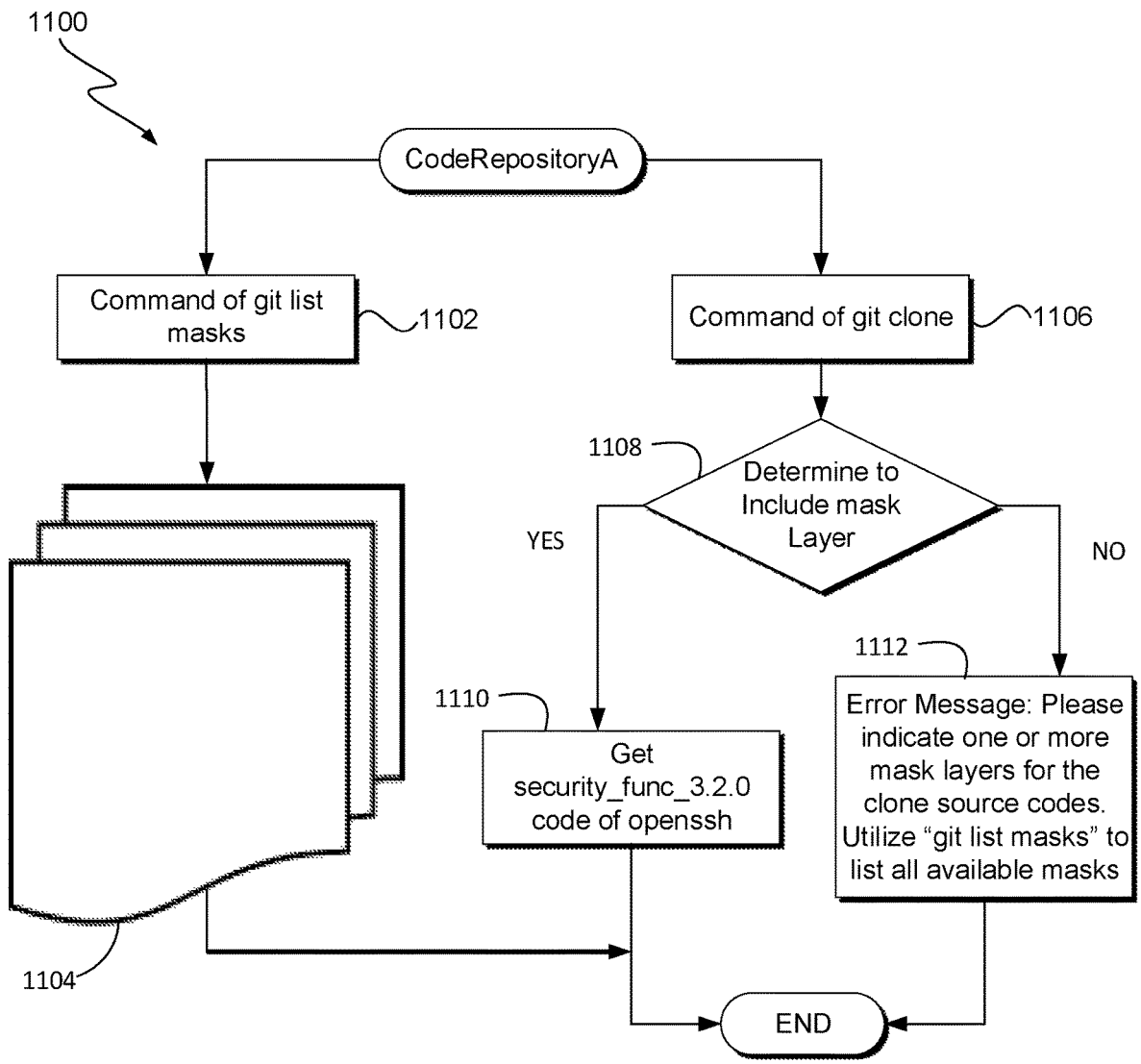
FIG. 11 depicts a visual representation for a flexible on-demand code security source code management toolkit, according to at least one embodiment of the present invention.

FIG. 11 depicts a visual representation for a flexible on-demand code security source code management toolkit 1100. Various embodiments of the present invention provide for code owners to release-on-demand the base code layer with mask layers for users to receive the required code based, at least in part, on user requirements. For example, one example embodiment provides that for mask 'security_func,' versions that are less than or equal to 3.1.9 are stable and include attribute 'protected false,' and versions that are greater than or equal to 3.2 are under development and include attribute 'protected true.' Versions with attribute 'protected true' are for use only by internal developers. In command 1102, a user requests the related version of security function of openssh and receives git list 1104 that includes, but is not limited to, an available list of masks for users and an available list of masks for internal developers. Various embodiments of the present invention provide that the owner of the source code can establish a set of authorizations for the source codes by adding a protected mask layer as an added security measure. Code management program 122 determines whether to include a mask layer for git clone command 1106 (determination 1108). The additional security measure provides that if a user that is not authorized attempts to git clone command 1106 to access the full source code without mask layers, the user will receive an error message 1112 (determination 1108, NO). If an internal developer attempts to git clone command 1106 code management program 122 communicates the full source codes 1110 without mask layers (determination 1108, YES).

In various embodiments, a computer-implemented method comprises organizing, by one or more processors, a project having source code into a stacked-layer framework, the stacked-layer framework having: (i) a code layer including the source code of the project, (ii) a label layer including one or more label pages labelling the source code according to respective features of the source code, and (iii) a mask layer including one or more mask pages concealing portions of the source code according to labels of the label layer. The computer-implemented method further comprises receiving, by one or more processors, a request from a user to utilize a portion of the project, wherein the request includes a user requirement identifying one or more desired features. The computer implemented method further comprises identifying, by one or more processors, a mask page of the one or more mask pages corresponding to the one or more desired features identified by the user requirement. The computer-implemented method further comprises communicating, by one or more processors, the identified mask page to the user.

In various embodiments, the user requirement identifies at least two desired features, and identifying the mask page includes merging mask pages corresponding to each of the at least two desired features into a single mask page.

In various embodiments, the computer-implemented method further comprises based, at least in part, on the request, creating, by one or more processors, a label page and a mask page according to the one or more desired features.

In various embodiments, the computer-implemented method further comprises generating, by one or more processors, a code dependency diagram of the source code utilizing a code scan tool; and creating, by one or more processors, the code layer by reformatting the source code based, at least in part, on the code dependency diagram. In various embodiments, the computer-implemented method further comprises identifying, by one or more processors, one or more features of the source code utilizing the code dependency diagram; and creating, by one or more processors, the one or more label pages and the one or more mask pages based, at least in part, on the identified one or more features.

In various embodiments, the concealing of portions of the source code according to the labels of the label layer includes concealing portions of the source code that do not correspond to features associated with the labels.

In various embodiments, the communicating of the identified mask page to the user includes: calculating, by one or more processors, an abstract message for the identified mask page; publishing, by one or more processors, the abstract message as being associated with the identified mask page; and sending, by one or more processors, to the user, the abstract message and information pertaining to the identified mask page. In various embodiments, the communicating of the identified mask page to the user further includes: prior to sending the abstract message and the information pertaining to the identified mask page to the user, encrypting, by one or more processors, the information pertaining to the identified mask page with a public key associated with the project, and further encrypting, by one or more processors, the encrypted information pertaining to the identified mask page and the abstract message with a public key associated with the user; receiving, by one or more processors, from the user: (i) a verification of the abstract message, and (ii) the encrypted information pertaining to the identified mask page; decrypting, by one or more processors, the encrypted information pertaining to the identified mask page using a private key associated with the project; retrieving, by one or more processors, the identified mask page utilizing the decrypted information pertaining to the identified mask page; and sending, by one or more processors, the identified mask page to the user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
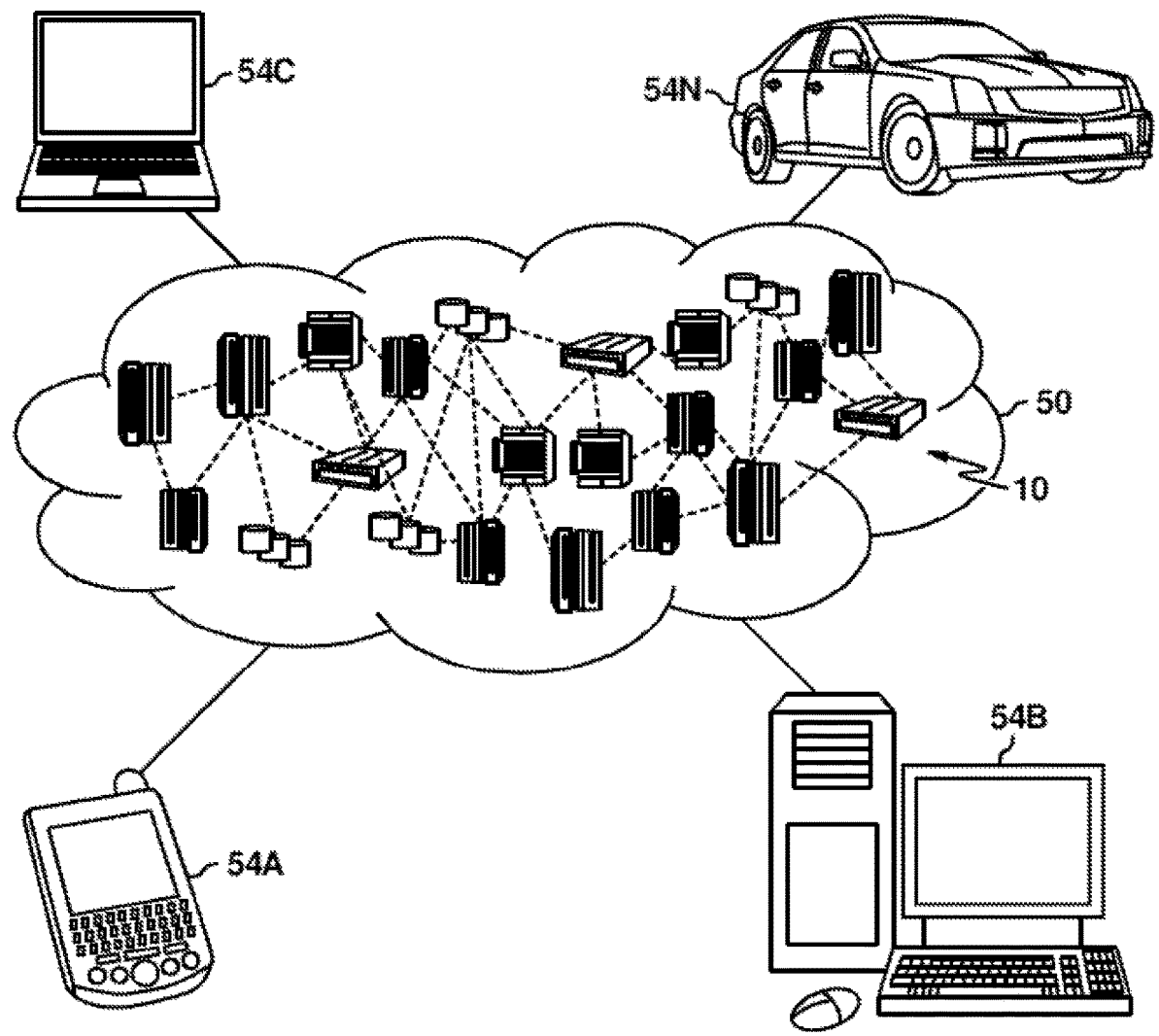
FIG. 12 depicts a cloud computing environment, according to at least one embodiment of the present invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
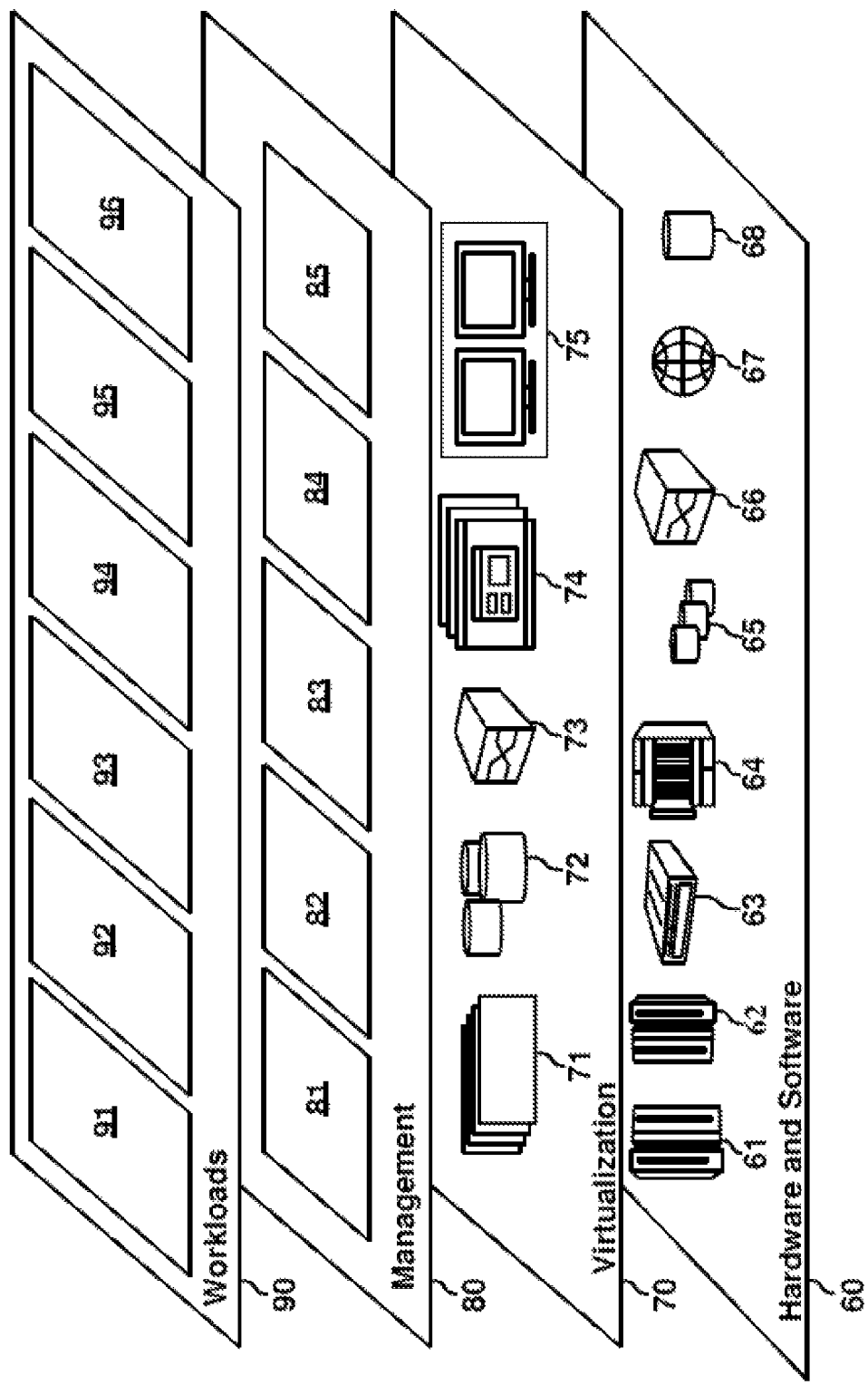
FIG. 13 depicts abstraction model layers, according to at least on embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 14:
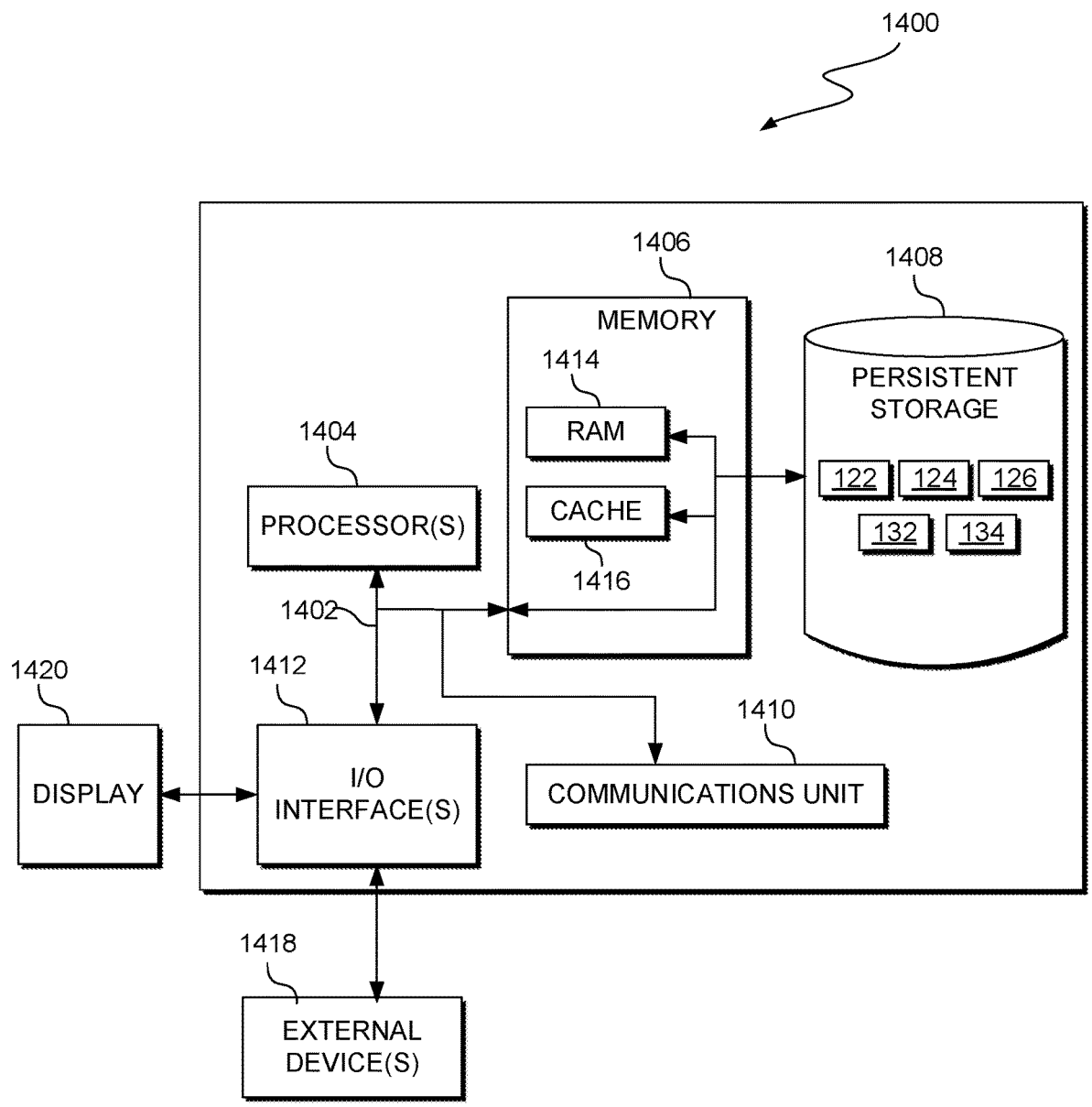
FIG. 14 depicts a block diagram of components of one or more computing devices within the computing environment depicted in FIG. 1, in accordance with an exemplary embodiment of the present invention.

FIG. 14 depicts a block diagram, 1400, of components of computer system 120 and client device 130, in accordance with an illustrative embodiment of the present invention. It should be appreciated that FIG. 14 provides only an illustration of one implementation and does not imply any limitations with regard to the environments in which different embodiments may be implemented. Many modifications to the depicted environment may be made.

Computer system 120 and client device 130 includes communications fabric 1402, which provides communications between computer processor(s) 1404, memory 1406, persistent storage 1408, communications unit 1410, and input/output (I/O) interface(s) 1412. Communications fabric 1402 can be implemented with any architecture designed for passing data and/or control information between processors (such as microprocessors, communications and network processors, etc.), system memory, peripheral devices, and any other hardware components within a system. For example, communications fabric 1402 can be implemented with one or more buses.

Memory 1406 and persistent storage 1408 are computer-readable storage media. In this embodiment, memory 1406 includes random access memory (RAM) 1414 and cache memory 1416. In general, memory 1406 can include any suitable volatile or non-volatile computer-readable storage media.

Code management program 122, computer interface 124, database 126, client program 132, and client interface 134 are stored in persistent storage 1408 for execution and/or access by one or more of the respective computer processors 1404 via one or more memories of memory 1406. In this embodiment, persistent storage 1408 includes a magnetic hard disk drive. Alternatively, or in addition to a magnetic hard disk drive, persistent storage 1408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1408 may also be removable. For example, a removable hard drive may be used for persistent storage 1408. Other examples include optical and magnetic disks, thumb drives, and smart cards that are inserted into a drive for transfer onto another computer-readable storage medium that is also part of persistent storage 1408.

Communications unit 1410, in these examples, provides for communications with other data processing systems or devices, including resources of network 110. In these examples, communications unit 1410 includes one or more network interface cards. Communications unit 1410 may provide communications through the use of either or both physical and wireless communications links. Code management program 122, computer interface 124, database 126, client program 132, and client interface 134 may be downloaded to persistent storage 1408 through communications unit 1410.

I/O interface(s) 1412 allows for input and output of data with other devices that may be connected to computer system 120 and client device 130. For example, I/O interface 1412 may provide a connection to external devices 1418 such as a keyboard, keypad, a touch screen, and/or some other suitable input device. External devices 1418 can also include portable computer-readable storage media such as, for example, thumb drives, portable optical or magnetic disks, and memory cards. Software and data used to practice embodiments of the present invention, e.g., code management program 122, computer interface 124, database 126, client program 132, and client interface 134 can be stored on such portable computer-readable storage media and can be loaded onto persistent storage 608 via I/O interface(s) 1412. I/O interface(s) 1412 also connect to a display 1420.

Display 1420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
   organizing, by one or more processors, a project having source code into a stacked-layer framework, the stacked-layer framework having: (i) a code layer including the source code of the project, (ii) a label layer including one or more label pages labelling the source code according to respective features of the source code, and (iii) a mask layer including one or more mask pages concealing portions of the source code according to labels of the label layer;
   receiving, by one or more processors, a request from a user to utilize a portion of the project, wherein the request includes a user requirement identifying one or more desired features;
   identifying, by one or more processors, a mask page of the one or more mask pages corresponding to the one or more desired features identified by the user requirement; and
   communicating, by one or more processors, the identified mask page to the user.

2. The computer-implemented method of claim 1, wherein:

the user requirement identifies at least two desired features, and identifying the mask page includes merging mask pages corresponding to each of the at least two desired features into a single mask page.

3. The computer-implemented method of claim 1, further comprising:

based, at least in part, on the request, creating, by one or more processors, a label page and a mask page according to the one or more desired features.

4. The computer-implemented method of claim 1, further comprising:

generating, by one or more processors, a code dependency diagram of the source code utilizing a code scan tool; and creating, by one or more processors, the code layer by reformatting the source code based, at least in part, on the code dependency diagram.

5. The computer-implemented method of claim 4, further comprising:

identifying, by one or more processors, one or more features of the source code utilizing the code dependency diagram; and creating, by one or more processors, the one or more label pages and the one or more mask pages based, at least in part, on the identified one or more features.

6. The computer-implemented method of claim 1, wherein the concealing of portions of the source code according to the labels of the label layer includes concealing portions of the source code that do not correspond to features associated with the labels.

7. The computer-implemented method of claim 1, wherein the communicating of the identified mask page to the user includes:

calculating, by one or more processors, an abstract message for the identified mask page;

publishing, by one or more processors, the abstract message as being associated with the identified mask page; and sending, by one or more processors, to the user, the abstract message and information pertaining to the identified mask page.

8. The computer-implemented method of claim 7, wherein the communicating of the identified mask page to the user further includes:

prior to sending the abstract message and the information pertaining to the identified mask page to the user, encrypting, by one or more processors, the information pertaining to the identified mask page with a public key associated with the project, and further encrypting, by one or more processors, the encrypted information pertaining to the identified mask page and the abstract message with a public key associated with the user;

receiving, by one or more processors, from the user: (i) a verification of the abstract message, and (ii) the encrypted information pertaining to the identified mask page;

decrypting, by one or more processors, the encrypted information pertaining to the identified mask page using a private key associated with the project;

retrieving, by one or more processors, the identified mask page utilizing the decrypted information pertaining to the identified mask page; and sending, by one or more processors, the identified mask page to the user.

9. A computer program product, the computer program product comprising:

one or more computer-readable storage media and program instructions stored on the one or more computer-readable storage media, the stored program instructions comprising:

program instructions to organize a project having source code into a stacked-layer framework, the stacked-layer framework having: (i) a code layer including the source code of the project, (ii) a label layer including one or more label pages labelling the source code according to respective features of the source code, and (iii) a mask layer including one or more mask pages concealing portions of the source code according to labels of the label layer;

program instructions to receive a request from a user to utilize a portion of the project, wherein the request includes a user requirement identifying one or more desired features;

program instructions to identify a mask page of the one or more mask pages corresponding to the one or more desired features identified by the user requirement; and program instructions to communicate the identified mask page to the user.

10. The computer program product of claim 9, wherein:

the user requirement identifies at least two desired features, and identifying the mask page includes merging mask pages corresponding to each of the at least two desired features into a single mask page.

11. The computer program product of claim 9, the stored program instructions further comprising:

program instructions to, based, at least in part, on the request, create a label page and a mask page according to the one or more desired features.

12. The computer program product of claim 9, the stored program instructions further comprising:

program instructions to generate a code dependency diagram of the source code utilizing a code scan tool; and program instructions to create the code layer by reformatting the source code based, at least in part, on the code dependency diagram.

13. The computer program product of claim 12, the stored program instructions further comprising:

program instructions to identify one or more features of the source code utilizing the code dependency diagram; and program instructions to create the one or more label pages and the one or more mask pages based, at least in part, on the identified one or more features.

14. The computer program product of claim 9, wherein the concealing of portions of the source code according to the labels of the label layer includes concealing portions of the source code that do not correspond to features associated with the labels.

15. A computer system, the computer system comprising:

one or more computer processors;

one or more computer readable storage medium; and program instructions stored on the one or more computer readable storage medium for execution by at least one of the one or more processors, the stored program instructions comprising:

program instructions to organize a project having source code into a stacked-layer framework, the stacked-layer framework having: (i) a code layer including the source code of the project, (ii) a label layer including one or more label pages labelling the source code according to respective features of the source code, and (iii) a mask layer including one or more mask pages concealing portions of the source code according to labels of the label layer;

program instructions to receive a request from a user to utilize a portion of the project, wherein the request includes a user requirement identifying one or more desired features;

program instructions to identify a mask page of the one or more mask pages corresponding to the one or more desired features identified by the user requirement; and program instructions to communicate the identified mask page to the user.

16. The computer system of claim 15, wherein:

the user requirement identifies at least two desired features, and identifying the mask page includes merging mask pages corresponding to each of the at least two desired features into a single mask page.

17. The computer system of claim 15, the stored program instructions further comprising:

program instructions to, based, at least in part, on the request, create a label page and a mask page according to the one or more desired features.

18. The computer system of claim 15, the stored program instructions further comprising:

program instructions to generate a code dependency diagram of the source code utilizing a code scan tool; and program instructions to create the code layer by reformatting the source code based, at least in part, on the code dependency diagram.

19. The computer system of claim 18, the stored program instructions further comprising:

program instructions to identify one or more features of the source code utilizing the code dependency diagram; and program instructions to create the one or more label pages and the one or more mask pages based, at least in part, on the identified one or more features.

20. The computer system of claim 15, wherein the concealing of portions of the source code according to the labels of the label layer includes concealing portions of the source code that do not correspond to features associated with the labels.

* * * * *